US009729446B1

(12) United States Patent
Sites et al.

(10) Patent No.: US 9,729,446 B1
(45) Date of Patent: *Aug. 8, 2017

(54) PROTOCOL-INDEPENDENT PACKET ROUTING

(71) Applicant: Google Inc., Mountain View, CA (US)

(72) Inventors: Richard Lee Sites, Menlo Park, CA (US); Yuhong Mao, Fremont, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/374,128

(22) Filed: Dec. 9, 2016

Related U.S. Application Data

(63) Continuation of application No. 14/450,593, filed on Aug. 4, 2014, now Pat. No. 9,553,808.

(51) Int. Cl.
*H04L 12/743* (2013.01)

(52) U.S. Cl.
CPC ...... *H04L 45/7453* (2013.01); *H04L 45/7457* (2013.01)

(58) Field of Classification Search
CPC .................. H04L 45/7453; H04L 45/7457
See application file for complete search history.

(56) References Cited

U.S. PATENT DOCUMENTS

| | | | |
|---|---|---|---|
| 6,731,633 B1 | 5/2004 | Sohor et al. | |
| 7,440,304 B1 | 10/2008 | Raj | |
| 9,553,808 B1 * | 1/2017 | Sites | H04L 45/7457 |
| 2009/0028150 A1 | 1/2009 | Johnsen et al. | |
| 2014/0244966 A1 | 8/2014 | Bosshart et al. | |
| 2015/0071053 A1 | 3/2015 | Kempf et al. | |
| 2015/0350078 A1 | 12/2015 | Azgin et al. | |
| 2016/0191384 A1 | 6/2016 | Shelar et al. | |

OTHER PUBLICATIONS

Ditmar, J. M. (Mar. 2000). A Dynamically Reconfigurable FPGA-based Content Addressable Memory for IP Characterization. Field-Programmable Logic and Applications: The Roadmap to Reconfigurable Computing Lecture Notes in Computer Science. vol. 1896, pp. 19-28. Retrieved from <http://www.imit.kth.se/ECS/esd/doc/OLD/ar00/MscTheses/report.pdf\>.

(Continued)

*Primary Examiner* — Melvin Marcelo
(74) *Attorney, Agent, or Firm* — Lerner, David, Littenberg, Krumholz & Mentlik, LLP

(57) ABSTRACT

In one aspect, one or more processors may be coupled to a content-addressable memory, a first memory and a second memory. The one or more processors may be configured to receive a data packet, read a predetermined number of bytes from the data packet, and match the read bytes to patterns corresponding to rows of the content-addressable memory. Further, the one or more processors may determine a number associated with the matched row, and based on the number, determine an initial routing instruction. The one or more processors may then determine which bits of the read bytes to hash using hash information stored in the first memory, hash the bits to generate a hash value, determine whether the value corresponds to routing information in the second memory, and route the data packet based on the routing information.

20 Claims, 4 Drawing Sheets

(56) References Cited

OTHER PUBLICATIONS

Le, H., Jiang, W., & Prasanna, V. K (Apr. 14-15, 2008). A SRAM-based Architecture for Trie-based IP Lookup Using FPGA. FCCM '08 Proceedings of the 2008 16th International Symposium on Field-Programmable Custom Computing Machines, pp. 33-42. Retrieved from <http://halcyon.usc.edu~pk/prasannawebsite/papers/hle_fccm08.pdf>.

Bosshart, P. et al. (Dec. 5, 2013). Programming Protocol-Independent Packet Processors, 6 pages. Retrieved from <http://www.cs.princeton.edu/~jrex/papers/of2.pdf>.

Juniper Networks, Inc. Protocol-Independent Routing Properties Configuration Guide. (© 2013). 412 pages. Retrieved from <http://www.juniper.net/techpubs/en_US/junos12.3/information-products/pathway-pages/config-guide-routing/config-guide-static-routing.pdf>.

Wikipedia, the Free Encyclopedia. (Feb. 25, 2002). Network switch, 7 pages. Retrieved from <http://en.wikipedia.org/wiki/Network_switch>.

Alvich, J. et al. Posted by Margaret Rouse. (Aug. 2006). network interface card (NIC), 4 pages. Retrieved from <http://searchnetworking.techtarget.com/definition/network-interface-card>.

Wikipedia, the Free Encyclopedia. (Jun. 10, 2003). Network interface controller, 4 pages. Retrieved from <http://en.wikipedia.org/wiki/Network_interface_controller>.

Aweya, J. (1999). IP Router Architectures: An Overview. Journal of Systems Architecture. vol. 46, pp. 483-511. Retrieved from <http://www.cs.virginia.edu/~cs757/papers/awey99.pdf>.

Scarpati, J. Posted by Margaret Rouse. (Sep. 2013). (TCAM) ternary content-addressable memory, 4 pages. Retrieved from <http://searchnetworking.techtarget.com/definition/TCAM-ternary-content-addressable-memory>.

Open Flow Switch Specification, Version 1.1.0 Implemented, Feb. 28, 2011, pp. 1-56.

\* cited by examiner

Packet 310

| Byte 1 | Byte 2 | Byte 3 | Byte 4 | Byte 5 | Byte 6 | Byte 7 | Byte 8 | Byte 9 | Byte 10 | ... | Byte N-1 | Byte N |
|---|---|---|---|---|---|---|---|---|---|---|---|---|

| Row | TCAM Pattern |
|---|---|
| 1 | xxxxxxxxxxxx BC9A78563412 xxxx xxxxx ... |
| 2 | xxxxxxxxxxxx xxxxxxxxxxxx 0800 xxxxx .... |
| 3 | xxxxxxxxxxxx xxxxxxxxxxxx 0800 45xxxxxxxxxxxxxxxx11xxx ... [20B] xxx[13B] xxx[payload]... |
| 4 | xxxxxxxxxxxx xxxxxxxxxxxx 0800 45xxxxxxxxxxxxxxxx06xxx ... [20B] xxx[13B]22xxxx... |
| 5 | ... 8847xxxx 0800 45..3F..0Axxxxxx0Axxxxxx... xxxx86DD..06...06...AZ xx... |
| 6 | Pattern for 6 |
| ... | |
| N-1 | Pattern for N-1 |
| N | xxxxxxxxxxxxxxxxxxxxxxxxxxxxxxxxxxxxxxxxxxxxxxxxxxx... |

PROTOCOL-INDEPENDENT PACKET ROUTING

CROSS-REFERENCE TO RELATED APPLICATIONS

The present application is a continuation of U.S. patent application Ser. No. 14/450,593, filed Aug. 4, 2014, the disclosure of which is incorporated herein by reference.

BACKGROUND

In packet switching networks, data packets may be transmitted from one network component to another network component. Each data packet may include one or more packet headers, which contain routing information. The routing information may specify where the data packet is to be routed. Network Interface Controllers (NICs) via network switches use the routing information to deliver each packet to its destination in accordance with a network protocol (e.g., TCP/IP, BGP, DHCP). Most application specific integrated circuits (ASICs) in NICs recognize only a limited number of protocols and usually cannot be modified to accept newly-invented protocols. Thus, data packets with protocols that are unsupported by a NIC's ASIC are processed by NIC firmware at a much slower rate compared to the processing rate of the ASIC. This causes processing bottlenecks and under-utilization of network bandwidth.

BRIEF SUMMARY

In one aspect, a method comprises receiving, by one or more processors, a data packet, and reading, by the one or more processors, a predetermined number of bytes from the data packet, and matching, by the one or more processors, the read bytes to a plurality of patterns corresponding to rows of a content-addressable memory. Further, the method comprises determining, by the one or more processors, a number associated with the matched row, and based on the number, determining by the one or more processors an initial routing instruction. Based on the initial routing instruction, the method comprises determining, by the one or more processors, which bits of the read bytes to hash using hash information stored in a first memory, and hashing, by the one or more processors, the determined bits to generate a hash value. Additionally, the method comprises determining, by the one or more processors, whether the hash value corresponds to routing information stored in a second memory, and routing, by the one or more processors, the data packet based on at least the routing information.

In another aspect, a system comprises a content-addressable memory, a first memory, a second memory, and one or more processors coupled to the content-addressable memory, the first memory and the second memory. The one or more processors are configured to receive a data packet, read a predetermined number of bytes from the data packet, and match the read bytes to a plurality of patterns corresponding to rows of the content-addressable memory. Further, the one or more processors are configured to determine a number associated with the matched row, and based on the number, determine an initial routing instruction. Moreover, the one or more processors are configured to determine which bits of the read bytes to hash using hash information stored in the first memory based on the initial routing instruction, and hash the determined bits to generate a hash value. Additionally, the one or more processors are configured to determine whether the hash value corresponds to routing information stored in the second memory, and route the data packet based on at least the routing information.

BRIEF DESCRIPTION OF THE DRAWINGS

FIG. 3 is an example set of TCAM patterns in accordance with aspects of the disclosure.

DETAILED DESCRIPTION

Figure 1:
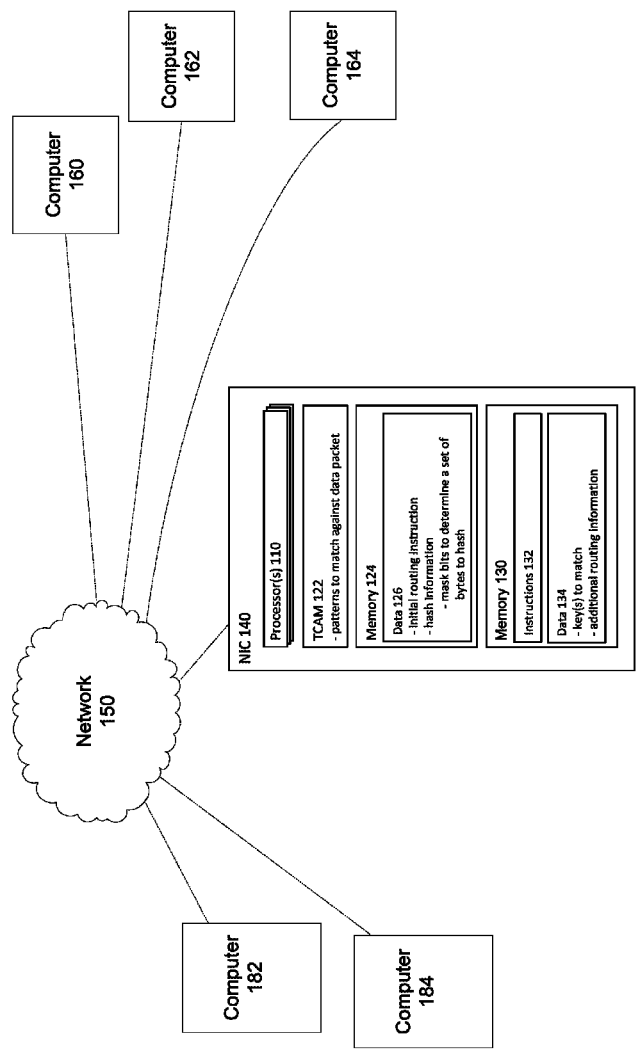
FIG. 1 is an example system diagram in accordance with aspects of the disclosure.

The present disclosure is directed to protocol-independent packet routing. For example, a network interface controller (NIC) of a computing device may receive a data packet to forward to another network component. The data packet may have headers that specify routing information to a particular destination. Upon receiving the packet, the NIC may use a ternary content-addressable memory (TCAM) to identify a pattern of the packet headers. Based on the pattern, the NIC may access a first static random access memory (SRAM) to identify routing information for the packets. For instance, this information may be a general mask of bits, which may be used to select and hash a particular set of bits. Subsequently, the hash value may be used to look up a second SRAM to determine respective routing actions for each data packet.

The above-descried TCAM, the first SRAM, and the second SRAM may be included in each network card of each host computing device and coupled to respective central computing units. Additionally, the TCAM may store a plurality of protocol patterns in corresponding rows. Each row may have a width that accommodates a large number of bits. In that regard, the bits of a data packet can be matched against the TCAM rows to obtain a match number. As such, the match number may be used to access the first SRAM to determine partial routing information for that data packet. For instance, the match number may be the lowest-numbered matching TCAM row.

In one aspect, the partial routing information stored in the first SRAM may be a general mask of bits, such as 128 bits, to be used in the routing decision. This may accommodate TCP/IPv4 five-tuples, TCP/IPv6 five-tuples, RDMA over Converged Ethernet (RoCE), offset routing bytes, combinations of outermost and encapsulated routing information, etc. The mask bits are then used to select a set of bits to hash, e.g., the desired N-tuple. In some instances, the set of bits to hash may be arbitrary. For each particular match number, the bits to hash are in fixed positions, such that the 128 bits may be constant for every match.

Once the set of bits to hash is determined, the bits may be hashed according to a specified method in order to generate a hash value. This hash value may have at least two pieces of information and may be also used to access the second SRAM. Once piece of the hash value may specify a location in the second SRAM and the second piece of the hash value may be used as a key to match against one or more fields at that SRAM location. If the key and the one or more fields match, the second SRAM contains corresponding routing information for that data packet. The routing information may complete information that may be necessary for the data packet to be routed to its network destination.

The above-described features may be advantageous in that a network device may be able to route packets to various destinations at a full line rate regardless of the protocols associated with the packets. In this regard, performance bottlenecks may be reduced.

FIG. 1 illustrates an example network 150 that joins a plurality of computing devices, e.g., computers 160, 162, 164, 182, 184, as well as a NIC 140 (which may be coupled to a computing device). The computers 160, 162, 164, 182 and 184 may also include their own respective NICs. As will be further described below, the network 150 may be any type of network configured to join two or more network devices. The network 150 may also be a flow controlled fabric. Each NIC of each computing device may be configured to forward, receive and/or process outgoing and incoming data packets through the network 150.

The computers 160, 162, 164, 182, 184 may be any of a variety of computing devices, including servers in a datacenter, personal digital assistants (PDAs), laptops, tablet PCs, netbooks, PCs, etc. These devices may be connected to the network 150 via a wired connection, such as through a modem, or wirelessly. Although only a few computers are depicted in FIG. 1, it should be appreciated that the system can include a large number of connected computers, with each different computer being at a different node of the network 150. As noted above, each computer may also include a NIC configured to facilitate the transmission of data packets from one node of the network 150 to another.

The network 150, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing. Such communication may be facilitated by any device capable of transmitting data to and from other computers, such as modems (e.g., dial-up, cable or fiber optic) and wireless interfaces.

The network components depicted within network 150 of FIG. 1 are not limited to only computing devices. For example, the computers 160, 162, 164, 182, 184 and NIC 140 depicted in network 150 may be any network component or device capable of receiving and forwarding data or data packets to appropriate destinations of a computer network, such as a network router, a switch, a hub, etc. For example, a switch may be rack-mounted on a network equipment rack as a Top-Of-Rack (TOR) switch. The TOR switch may be coupled to a plurality of central computing units which may also be mounted on the rack with other types of computing and storage components.

Each computing device connected to network 150 may include one or more processors, a memory coupled thereto, as well as other components. The NIC in each computing device may provide a dedicated, full-time connection to a network and also have hardware capable of processing instructions and data stored in one or more memories. For example, the NIC 140 may be a computer hardware component that may deliver an incoming packet to one or more queues in a computing device's main memory to be forwarded to other network components, such as computers 160, 162, 164, 182, 184. The NIC 140 may be configured to implement a particular physical layer and data link layer, such as Ethernet, Wi-Fi, Token Ring, etc. In addition, the NIC 140 may provide the connection to other network devices via a wired connection or a wireless connection.

For example, NIC 140 includes one or more processors 110, TCAM 122, memory 124, and memory 130. The memory 130 stores instructions 132 and data 134, such as key(s) to match and additional routing information. Similar to memory 130, TCAM 122 and memory 124 may store various types of data, such as TCAM patterns to match against the data of an incoming packet, initial routing instructions, and hash information which may include at least mask bits to determine a set of bits of the packet to hash (as will be discussed in more detail below with respect to at least FIG. 2).

The one or more processors 110 of NIC 140 may be logic circuitry (e.g., logic gates, flip-flops, etc.) hard-wired into the NIC 140 itself or may be a dedicated application specific integrated circuit (ASIC). It should be understood that the one or more processors 110 is not limited to hard-wired logic circuitry, but may also include any commercially available CPU, or any hardware-based processors, such as a field programmable gate array (FPGA). Although FIG. 1 functionally illustrates the processor, memory, and other elements of NIC 140 as being within the same block, it will be understood by those of ordinary skill in the art that the processor and memory may actually include multiple processors and memories that may or may not be stored within the same physical housing. For example, memory 130 may be a volatile memory or other type of memory located in a casing different from that of NIC 140. Similarly, memory 124 may be located in a casing different from that of NIC 140. Accordingly, references to a host may be understood to include references to a collection of processors and memories that may or may not operate in parallel.

The memory 130 of NIC 140 may store information accessible by the one or more processors 110, including data instructions 132 that may be executed or otherwise used by the one or more processors 110 and data 134. For example, memory 130 may be of any type capable of storing information accessible by the processor(s), including a computing device-readable medium, or other medium that stores data that may be read with the aid of an electronic device, such as a volatile memory, non-volatile as well as other write-capable and read-only memories. By way of the example depicted in FIG. 1 only, memory 130 may be a static random-access memory (SRAM) configured to provide fast lookups. Systems and methods may include different combinations of the foregoing, whereby different portions of the instructions and data are stored on different types of media.

The data 134 may be retrieved, stored or modified by the one or more processors 110 in accordance with the instructions 132 stored in memory 130. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 132 may be any set of instructions to be executed directly (such as machine code) or indirectly (such as scripts) by the one or more processors 110. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

As will be discussed in more detail below, the one or more processors 110 may execute the instructions 132 and other instructions (e.g., in memory 124) to determine initial routing instructions for a data packet, determine a set of bits to hash based on hash information, hash to generate a hash value, determine whether the hash value corresponds to additional routing information, etc. Data 134 may be used by the one or more processors 110 in accordance with the instructions 132. The data 134 may include at least key(s) to match against various hash values and additional routing information to determine destination queue numbers at the destination computing device.

The TCAM 122 of NIC 140 may be a memory that is capable of searching its entire contents in at least one clock cycle. As will be discussed more in detail with respect to FIGS. 2-3, the TCAM 122 may have a plurality of rows and may catalogue data into a particular row. The width of the TCAM rows may correspond to the size of the corresponding data. For example, the TCAM patterns that may be used to match against the bits of incoming network packets may be 1024 bits (or 128 bytes). Thus, each row may be at least 1024 bit-positions wide. Moreover, the TCAM may store and query data using three different inputs: 0, 1, and "x." The "x" input is a wildcard state that enables the TCAM to perform broader searches based on pattern matching in addition to the binary data. In this regard, the TCAM 122 does not have to perform exact-match searches using only the binary data.

Due to TCAM 122's location in NIC 140, the TCAM 122 may generally be smaller in size compared to large TCAMs (which may hold more than 4,000 entries). In addition, the rows of TCAM 122 may have large widths in order to accommodate lengthy bit patterns used during a matching process.

Similar to the memory 130, the memory 124 of NIC 140 may also store information accessible by the one or more processors 110, including data 126 and instructions that may be executed or otherwise used by the one or more processors 110. Data 126 may include at least initial routing instructions and hash information. The hash information may include a bit mask, a byte mask, a set of ranges of bit numbers, or some other descriptions of portions of a packet to use as inputs that are used to determine the set of bits to hash in the hash function hardware. Memory 124 may be of any type capable of storing information accessible by the processor(s), including a volatile memory, non-volatile memory, computing device-readable medium, or other medium that stores data. In this example, memory 124 may also be a SRAM configured to provide fast lookups.

In addition to the operations described above and illustrated in FIG. 1, various operations will now be described. It should be understood that the following operations do not have to be performed in the precise order described below. Rather, various steps can be handled in a different order or simultaneously, and steps may also be added or omitted.

Figure 2:
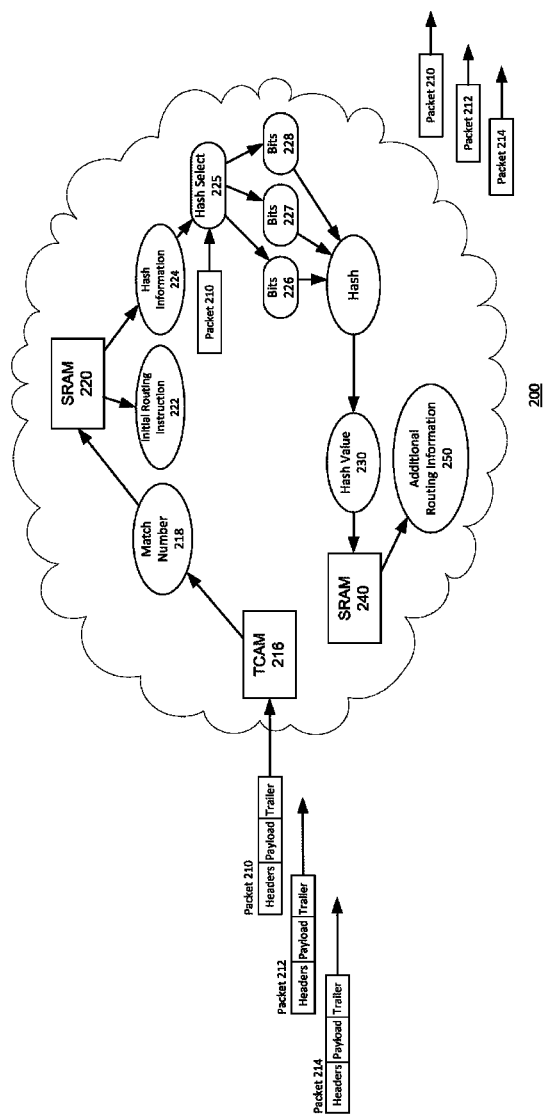
FIG. 2 is another example system diagram in accordance with aspects of the disclosure.

FIG. 2 illustrates an example of protocol-independent packet routing. For example, the hardware and networking components, such as the ones depicted in FIG. 1, may be configured to route data packets to their respective destinations at a full line rate regardless of the network protocols associated with the packets. As shown in FIG. 2, a NIC 200 may receive data packets 210, 212, 214 to be forwarded to various network components, e.g., host computing devices, computers, switches, etc. via a network. Each data packet may include headers, a payload, and trailer. The packet headers of data packet 210, for instance, may define one or more network protocols.

To begin the process of routing the data packet 210 to its correct destination, a predetermined number of the packet's bits or bytes may be read and matched against the plurality of patterns stored in TCAM 216 in order to generate a match number 218. This match number 218 may be used to look up SRAM 220 for selecting specific bits to hash in order to generate a hash value 230. The hash value may then be used to look up SRAM 240 to determine whether corresponding routing information for data packet 210 exists. If found, the routing information may complete the information necessary to route packet 210 to its network destination.

Data packets 210, 212, 214 may each include headers, a payload, and a trailer. For example, the headers of data packet 210 may include control information. The control information may at least in part specify where the data packet 210 is to be routed. For instance, the control information may include source and destination network addresses, network protocol, various sequencing information, packet number, etc. Further, the payload of packet 210 may include user data. For instance, the user data in an e-mail data packet may be associated with the content of the e-mail, such as the text, sender, recipient, etc. The trailer of data packet 210 may include error correction data and information indicating that the data packet ends.

Initially, the NIC 200 may read a predetermined number of packet bits or bytes and match those bits or bytes against the patterns stored in TCAM 216. For example, the predetermined number may be 128 bytes, e.g., the first 128 bytes of data packet 210. In other instances, the predetermined number of bits or bytes may be more or less depending on the lengths of the patterns stored in the TCAM 216 as well as other factors. The predetermined number of 128 bytes may be a sufficient number to capture the various packet headers associated with data packet 210.

The TCAM 216 may store a plurality of bit patterns, each bit pattern corresponding to a row of the TCAM. Each row may have a particular width. In this example, each row may be at least 128 byte-positions wide (1024 bit-positions wide) since the number of bytes that may be read is 128 bytes. Once the first 128 bytes of data packet 210 are read, the pattern of the read bytes may be matched against the patterns corresponding to rows of TCAM 216. When a match is found, the match number 218 may be determined. For example, the match number may correspond to row number of the matching row, e.g., the lowest-numbered matching row. The match number itself may be of a particular length, e.g., a seven-bit highest priority match number. In that regard, the match number may indicate only the pattern of packet headers present in data packet 210 to determine an initial routing instruction.

Based on the match number 218, an initial routing instruction 222 for data packet 210 may be determined. In some instances, the NIC hardware may drop the data packet 210 and no further hashing or access to SRAM 240 may be necessary. In other instance, the NIC hardware may deliver the packet 210 to various queues to be routed to its respective destination in the network based on the initial routing information 222. In yet other examples, the NIC may use the match number 218 to access SRAM 220 and determine a set of bits from the read bytes to hash based on hash information 224 derived from the SRAM 220. The selected bits may be hashed in accordance with at least a hash select function 225 and a hashing method using the packet 210 as input.

As shown, SRAM 220 may be located within the NIC 200. Thus, SRAM 220 may be a NIC SRAM and may store a set of mask bits, mask bytes, or other types of descriptions of the portions of the data packet, where each bit, byte, or description corresponds to a portion of the header pattern of the data packet 210. For example, SRAM 220 may store 128 mask bits, each bit corresponding to each byte of the previously read 128 bytes of data packet 210. The mask bits may then be used to select a set of bits to hash, e.g., bits 226, 227, 228. For each particular match number, the bits to hash may be in fixed positions, such that the 128 bits associated with the bytes are constant per match. Moreover, the SRAM 220 may specify one or more hash methods and a seed value for any subsequent hashing of the selected set of bits.

In one example, each byte of the read 128 bytes of data packet 210 may allow the NIC 200 to select arbitrary bits to be included in the set of bits to hash based on the mask bits stored in SRAM 220. In an alternative example, one or more bits of the read 128 bytes of data packet 210 may be preserved or set to zero. In the example of FIG. 2, at least bits 226, 227, and 228 may be selected for hashing. As such, bits 226, 227 and 228 are included in the set of bits to hash. Once a complete set of bits to hash is determined, the NIC 200 may hash the bits in logic hardware. The result of the hash function may be a destination queue number in a destination computer's main memory. In one example, the hash value 230 may have two pieces of information and may be used to match against information stored in SRAM 240. One piece of information may specify a particular location in SRAM 240. The second piece of information may be used as a key to match against the one or more fields of the specified location in SRAM 240.

The SRAM 240 may store additional routing information that may be necessary for data packets to be routed to their correct network destinations. For example, the additional routing information 250 may correspond to the data packets 210, 212, and 214, respectively. In that regard, if there is a match between the above-mentioned key and the one or more fields of the specified location in SRAM 240, the one or more processors 110 may use the additional routing information 250 to route the data packet 210 to determine a destination queue number in the destination computer's memory, as depicted in FIG. 2. Similarly, the additional routing information 250 may also be used to determine respective destination queue numbers. If there is no match, the SRAM 240 may contain default routing information specifying how to route the data packet.

The various components used for the protocol-independent packet routing depicted in FIG. 2 may be arranged on one or more circuit boards, one or more NICs, or part of one or more computing devices. For example, as described above, TCAM 216, SRAM 220 and SRAM 240 may all be arranged onto one NIC, e.g., NIC 200.

In this regard, for each incoming packet, at least TCAM 216, SRAM 220, and SRAM 240 are configured to determine additional routing information in order to route data packets to their respective network destinations independent of the associated network protocols. The above-described aspects of the disclosure may also accommodate newly developed types of network protocols.

As described above, a byte pattern associated with an incoming data packet may be matched against the patterns stored in a TCAM. FIG. 3 illustrates an example of various patterns that may be stored in a TCAM 300. Similar to TCAMs 122 or 216 of FIGS. 1 and 2, the TCAM 300 may be included in a NIC and may generally be smaller in size with rows having large widths to accommodate lengthy bit patterns. For instance, TCAM 122 may have rows 1, 2, 3, 4, 5, 6, up to N−1, and N, where N represents the number corresponding to the last row. It should also be understood that hexadecimal digits (e.g., 0-9, A-F) may be used as shorthand for several of the TCAM patterns below.

Each row may contain a particular TCAM pattern. By way of example only, row 1 contains a TCAM pattern that matches link-header source address 12:34:56:78:9A:BC. In another example, row 2 contains a TCAM pattern that matches all IPv4 packets. In yet another example, row 3 contains a TCAM pattern that matches UDP/IPv4 packets with zero bytes of IP options. In a further example, row 4 contains a TCAM pattern that matches TCP/IPv4 SYN packets with zero bytes of IP options. In another example, row 5 contains a TCAM pattern that matches Multiprotocol Label Switching (MPLS) followed by IPv4 followed by Generic Routing Encapsulation (GRE) followed by inner IPv6 and inner TCP with SYN packets. In an additional example, row 6 and N−1 may also contain different packet header patterns. Further, row N may contain a TCAM pattern that matches all packet header patterns.

The TCAM patterns may be listed in order of highest priority to lowest priority, e.g., specific patterns to general patterns. For example, the pattern corresponding to row N may be considered the lowest-priority match for all packet header patterns. When multiple TCAM patterns match the byte pattern associated with an incoming data packet, the highest-priority match may be used, which may correspond to the lowest-numbered matching row.

The above-described TCAM patterns may be at least 1024 bit-positions wide. Thus, as depicted in FIG. 3, the patterns corresponding to rows 1-6 are shown in mixed hexadecimal and a plurality of "x" inputs, which represent the wild card states. Moreover, byte pattern "ZZ" is used to denote a link to a subsequent bit-by-bit pattern. For example, the "8847" in the TCAM pattern corresponding to row 5 represents MPLS; the "0800" represents IPv4; the "3F," in hexadecimal, represents GRE; the "86DD" represents IPv6; the "06" represents inner TCP and ZZ represents the SYN bits. In this regard, the one or more bytes associated with the packet headers may be scattered throughout the 1024 bit pattern in each row.

In an illustrative example, a data packet 310 may be matched against the rows of TCAM 300. The data packet 310 may have bytes 1-10, N−1, and up to N, where N represents the number associated with the last byte. For instance, the first 128 bytes of data packet 310 may be read and matched against the rows of TCAM 300. One or more processors coupled to the NIC may determine that the byte pattern of the data packet 310 matches row 4 (e.g., a variation of TCP/IPv4), row 6, and row N. Row 4 may be the highest-priority match and corresponds to the lowest-numbered matching row. Thus, "4" may be the matching number and used to determine initial routing instructions. As noted above, one example initial routing instruction may be to hash a set of bits of data packet 310 to determine further routing information in a second SRAM. The set of bits to hash may be determined by a bit mask stored in the first SRAM. Based on the match number, the bit mask may identify which bits to hash. And the bits may be in fixed positions, such that the 128 bits associated with the bytes are constant per match.

Once the set of bits are hashed, a hash value may be generated. This hash value may be used to look up the second SRAM for further routing information in order to properly route the data packet 310 to its correct network destination, regardless of how the protocol bytes of data packet 310 are arranged.

The patterns stored in a TCAM may be updated in order to accommodate new types of protocols. For example, new protocol bytes may be added to the pattern corresponding to row 5 of TCAM 122, or obsolete protocol bytes may be removed from the same pattern.

Figure 4:
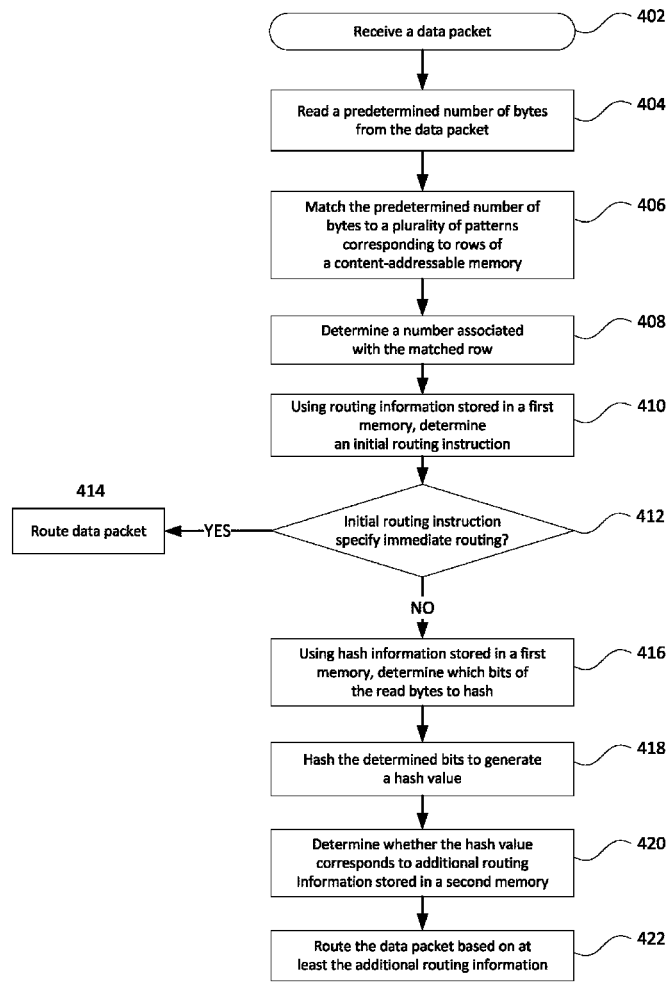
FIG. 4 is an example flow diagram in accordance with aspects of the disclosure.

FIG. 4 is an example flow diagram 400 of protocol-independent packet routing. Using the non-limiting example depicted in FIG. 2, a NIC may receive a data packet to be queued in the computing device's main memory and eventually forwarded to a particular network destination at block 402. Upon receipt of the data packet, the NIC 200, or other hardware components capable of reading packet content, may read a predetermined number of bytes from the data packet at block 404. This predetermined number may be 128 bytes. Once the bytes of the data packet are read, the one or more processors may match the bytes to a plurality of patterns stored in a memory at block 406. The memory may be a TCAM.

At block 408, the one or more processors may run through the plurality of TCAM patterns in one or more clock cycles and determine a number associated with a matched row. For example, this number may correspond to a particular row number. The row may correspond to the highest-priority match. In that regard, the match number may be the lowest-numbered matched row of the TCAM. Based on this number, the one or more processors may determine an initial routing instruction at block 410.

At block 412, the NIC 200 may identify whether the initial routing instruction specifies an immediate delivery to various queues in the computing device's main memory. If an immediate delivery is identified, then the NIC may send the data packet to its queue(s) based on where the data packet is to be forwarded.

However, if the NIC 200 identifies that an immediate delivery is not specified, then the NIC 200 may determine which bits of the read bytes to hash using hash information stored in SRAM 220 at block 416. As described above, the hash information may include mask bits, e.g., 128 bits, mask bytes, or other types of information identifying the portions of the data packet. Each bit of the mask may correspond to each read byte of the data packet. The match number determined at block 408 may be used to determine which of the read bits will be included in the set of bits to hash. The match number instructs which of the read bits are to be included for hashing. Once the set of bits to hash are determined, the one or more processors 110 may hash the bits via logic hardware at block 418. This, in turn, generates a hash value.

As described above, the hash value may identify at least two pieces of information: the first piece of information specifies a location in SRAM 240 and the second piece of information identifies a key to be matched against the one or more fields at the locations in SRAM 240. In that regard, the hash value may at least specify where to look in SRAM 240 and whether the additional routing information for the data packet exists. At block 420, the one or more processors may determine whether the identified key matches the one or more fields at the specified location in SRAM 240. When there is a match, the second memory contains additional routing information based on the generated hash value to route the data packet to its respective network destination. If there is no match, default information specifying how the packet is to be routed may be identified.

The above-described aspects of the disclosure may be advantageous in that that a network device may be able to route packets to various destinations at a full line rate regardless of the protocols associated with the packets. In this regard, performance bottlenecks may be reduced.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. The examples and other arrangements may be devised without departing from the spirit and scope of the subject matter defined by the appended claims. Further, the same reference numbers in different drawings can identify the same or similar elements.

The invention claimed is:

1. A method comprising:
   receiving, by one or more processors, a data packet;
   reading, by the one or more processors, a predetermined number of bytes from the data packet;
   determining, by the one or more processors, an initial routing instruction based at least in part on information in the received data packet;
   based on the initial routing instruction, determining, by the one or more processors, which bits of the read bytes to hash using hash information stored in a first memory;
   hashing, by the one or more processors, the determined bits to generate a hash value;
   determining, by the one or more processors, whether the hash value corresponds to routing information stored in a second memory; and
   routing, by the one or more processors, the data packet based on at least the routing information.

2. The method of claim 1, further comprising matching, by the one or more processors, the read bytes to a plurality of patterns corresponding to rows of a content-addressable memory, wherein the content-addressable memory is a ternary content addressable memory (TCAM).

3. The method of claim 2, further comprising determining, by the one or more processors, a number associated with the matched row, wherein the number is a lowest-numbered matching row of the TCAM.

4. The method of claim 1, wherein the first memory and the second memory are each a volatile memory.

5. The method of claim 4, wherein the volatile memory is a static random access memory (SRAM).

6. The method of claim 1, wherein the predetermined number of bytes is 128 bytes.

7. The method of claim 1, wherein the hash value includes information to specify a location in the second memory and a key for matching against one or more fields at the location.

8. The method of claim 7, wherein the determination of whether the hash value corresponds to routing information is based on the key matching the one or more fields at the location in the second memory.

9. The method of claim 1, wherein the initial routing instruction is used to route the packet immediately or specify at least the hash information, wherein the hash information includes at least a bit mask of size N.

10. The method of claim 9, wherein N is 128 bits.

11. A system comprising:
a first memory;
a second memory;
one or more processors coupled to the first memory and the second memory, the one or more processors configured to:
receive a data packet;
read a predetermined number of bytes from the data packet;
determine an initial routing instruction based at least in part on information in the received data packet;
based on the initial routing instruction, determine which bits of the read bytes to hash using hash information stored in the first memory based;
hash the determined bits to generate a hash value;
determine whether the hash value corresponds to routing information stored in the second memory; and
route the data packet based on at least the routing information.

12. The system of claim 11, further comprising a content-addressable memory, wherein the one or more processors are further configured to match the read bytes to a plurality of patterns corresponding to rows of a content-addressable memory, wherein the content-addressable memory is a ternary content addressable memory (TCAM).

13. The system of claim 12, wherein the one or more processors are further configured to determine a number associated with the matched row, the number being a lowest-numbered matching row of the TCAM.

14. The system of claim 11, wherein the first memory and the second memory are each a volatile memory.

15. The system of claim 14, wherein the volatile memory is a static random access memory (SRAM).

16. The system of claim 11, wherein the predetermined number of bytes is 128 bytes.

17. The system of claim 11, wherein the hash value includes information to specify a location in the second memory and a key for matching against one or more fields at the location.

18. The system of claim 17, wherein the determination of whether the hash value corresponds to routing information is based on the key matching the one or more fields at the location in the second memory.

19. The system of claim 11, wherein the initial routing instruction is used to route the packet immediately or specify at least the hash information, wherein the hash information includes at least a bit mask of size N.

20. The system of claim 19, wherein N is 128 bits.

* * * * *